United States Patent
Li

(10) Patent No.: US 11,450,005 B2
(45) Date of Patent: Sep. 20, 2022

(54) IMAGE PROCESSING METHOD, APPARATUS, TERMINAL DEVICE AND STORAGE MEDIUM

(71) Applicant: Beijing Xiaomi Mobile Software Co., Ltd., Beijing (CN)

(72) Inventor: Rui Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 2 days.

(21) Appl. No.: 17/003,263

(22) Filed: Aug. 26, 2020

(65) Prior Publication Data

US 2021/0334977 A1    Oct. 28, 2021

(30) Foreign Application Priority Data

Apr. 24, 2020   (CN) .......................... 202010333520.X

(51) Int. Cl.
*G06T 7/11* (2017.01)
*G06T 7/187* (2017.01)

(52) U.S. Cl.
CPC ............... *G06T 7/11* (2017.01); *G06T 7/187* (2017.01)

(58) Field of Classification Search
CPC .......... G06T 7/187; G06T 7/11; G06T 3/0093
See application file for complete search history.

(56) References Cited

U.S. PATENT DOCUMENTS

| | | | | |
|---|---|---|---|---|
| 5,469,189 A | * | 11/1995 | Noguchi | G06F 3/0481 345/441 |
| 2003/0228067 A1 | * | 12/2003 | Miyake | H04N 1/409 382/275 |
| 2010/0008565 A1 | * | 1/2010 | Chien | G06T 3/00 382/154 |
| 2012/0121198 A1 | * | 5/2012 | Liao | H04N 19/105 382/238 |
| 2018/0210183 A1 | * | 7/2018 | Nishikawa | G02B 21/36 |

FOREIGN PATENT DOCUMENTS

| CN | 107977947 A | 5/2018 |
|---|---|---|
| CN | 108335259 A | 7/2018 |

OTHER PUBLICATIONS

Extended European Search Report dated Mar. 12, 2021 in European Patent Application No. 20198498.6, 7 pages.

* cited by examiner

*Primary Examiner* — Syed Haider
(74) *Attorney, Agent, or Firm* — Oblon, McClelland, Maier & Neustadt, L.L.P.

(57) ABSTRACT

Aspects of this disclosure can provide a method that is applied to an image with a rectangular shape. The method can include dividing the image into a plurality of areas based on right angles of the image, and establishing a corresponding rectangular coordinate system for the right angle within each of the plurality of areas. Further, an intersection of a first axis and a second axis is taken as an origin of the rectangular coordinate system and a quadrant where the right angle is located is taken as a first quadrant of the corresponding rectangular coordinate system. The method can further include determining whether a pixel in the image is located in the first quadrant, and, if it is determined that the pixel is located in the first quadrant of the rectangular coordinate system, performing an operation on the pixel, otherwise, performing no operation on the pixel.

12 Claims, 7 Drawing Sheets

IMAGE PROCESSING METHOD, APPARATUS, TERMINAL DEVICE AND STORAGE MEDIUM

RELATED APPLICATION

The present application is based on and claims the priority to the Chinese Patent Application No. 202010333520.X, filed on Apr. 24, 2020, the entire contents of which are hereby incorporated by reference.

TECHNICAL FIELD

The present application relates to the field of computer software technologies, including an image processing method, apparatus, terminal device, and storage medium.

BACKGROUND

Before an image is displayed, image processing operations may be required to perform on the image. For an image with a rectangular shape, for example, considering that when the image with the rectangular shape is displayed by a terminal device with a rounded screen, a phenomenon that a right angle of the image does not match with the rounded screen may appear, thus before displaying the image with the rectangular shape, it is required to perform a rounded-corner processing on the image to make the displayed image shape match the rounded screen. When the rounded-corner processing is performed on the image with the rectangular shape, it is necessary to perform a corresponding operation on each pixel in the image to determine whether the pixel is within the round corner to be matched, so as to determine whether to perform the corresponding rounded-corner processing on the pixel. Therefore, this method requires numerous calculations, and greatly consumes a graphics processing unit (GPU), which also affects overall performances of the device.

SUMMARY

The present application proposes an image processing method, apparatus, terminal device, and storage medium that can solve problems in the related art, such as large amounts of calculations required, greatly consuming GPU, and affecting overall performances of the device, when the image processing is performed on rectangular images.

A first aspect of the present application provides an image processing method that can be applied to an image having a rectangular shape. The method can include dividing the image into a plurality of areas based on right angles of the image, and establishing a corresponding rectangular coordinate system for the right angle within each of the plurality of areas. Straight lines which are parallel to rectangular sides constituting the right angle and are at a first distance and a second distance from the rectangular sides respectively are taken as a first axis and a second axis of the rectangular coordinate system. Further, an intersection of the first axis and the second axis is taken as an origin of the rectangular coordinate system, in individual quadrants of the rectangular coordinate system, and a quadrant where the right angle is located is taken as a first quadrant of the corresponding rectangular coordinate system. The method can further include determining whether a pixel in the image is located in the first quadrant of the rectangular coordinate system, and, if it is determined that the pixel is located in the first quadrant of the rectangular coordinate system, performing an operation on the pixel, otherwise, performing no operation on the pixel.

A second aspect of the present application can provide an image processing apparatus that is applied to an image having a rectangular shape. The apparatus can include a rectangular coordinate system establishing module that is configured to divide the image into a plurality of areas based on right angles of the image, and establish a corresponding rectangular coordinate system for the right angle within each of the plurality of areas. Straight lines which are parallel to rectangular sides constituting the right angle and are at a first distance and a second distance from the rectangular sides respectively are taken as a first axis and a second axis of the rectangular coordinate system. Further, an intersection of the first axis and the second axis is taken as an origin of the rectangular coordinate system, in individual quadrants of the rectangular coordinate system, and a quadrant where the right angle is located is taken as a first quadrant of the corresponding rectangular coordinate system. The apparatus can further include a determining module that is configured to determine whether a pixel in the image is located in the first quadrant of the rectangular coordinate system, and an operation module that is configured to, if it is determined that the pixel is located in the first quadrant of the rectangular coordinate system, perform an operation on the pixel, otherwise, perform no operation on the pixel.

A third aspect of the present application provides a terminal device, including a memory, a processor, and a computer program stored on the memory and executable on the processor. The processor implements the method described in any of the embodiments above when executing the program.

A fourth aspect of the present application provides a computer storage medium on which a computer program is stored, wherein when the program is executed by a processor, the method described in any of the embodiments above is implemented.

BRIEF DESCRIPTION OF THE DRAWINGS

Various exemplary embodiments of this disclosure that are proposed as examples will be described in detail with reference to the following figures, wherein like numerals reference like elements, and wherein.

DETAILED DESCRIPTION

Figure 1:
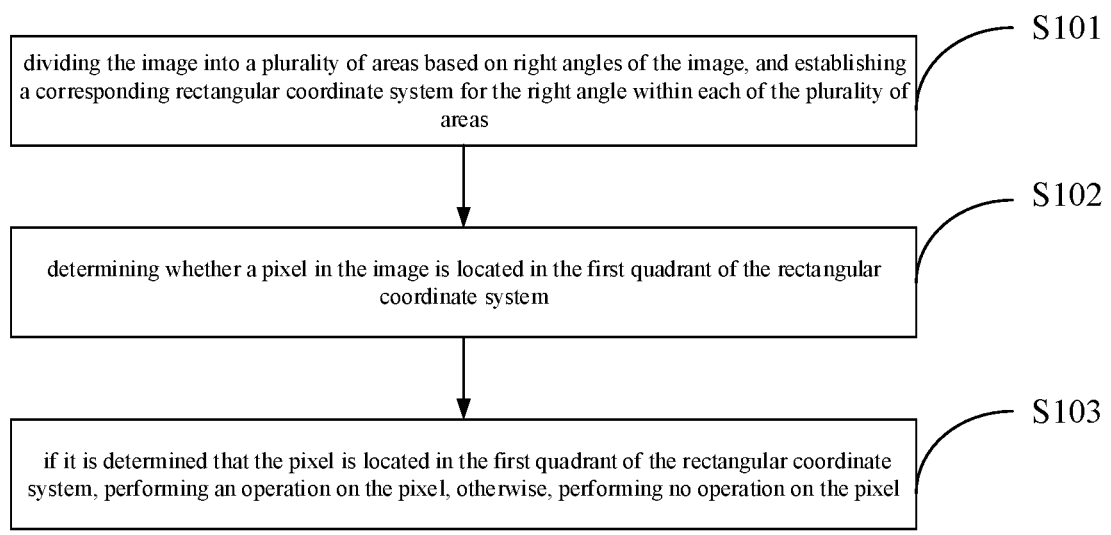
FIG. 1 is a flowchart of an image processing method provided by an embodiment of the present application.

The present application will be further described in detail below with reference to the drawings and embodiments. It can be understood that the specific embodiments described herein are only used to explain the related disclosure, but not to limit the disclosure. In addition, it should be noted that, for ease of description, only parts related to the disclosure are shown in the drawings.

The "first", "second" and similar words used in the present application do not denote any order, quantity or importance, but are only used to distinguish different parts. "Include" or "comprise" or a similar word means that an element before the word covers elements listed after the word, and does not exclude a possibility of covering other elements. "Up", "down", or the like is only used to indicate a relative position relationship. When an absolute position of the described object is changed, the relative position relationship may also change accordingly.

In the present application, when it is described that a specific component is located between a first component and a second component, there may or may not be an intermediate component between the specific component and the first component or the second component. When it is described that the specific component is connected to other components, the specific component may be directly connected to other components without intervening components, or may not be directly connected to other components but with the intervening components.

Unless otherwise defined, all terms used herein, including technical and scientific terms, have the same meaning as commonly understood by one of ordinary skill in the art to which the present disclosure belongs. It should also be noted that terms, such as those defined in commonly used dictionaries, should be interpreted as having a meaning that is consistent with their meaning in the context of the relevant art and will not be interpreted in an idealized or overly formal sense, unless clearly defined in the present application.

The techniques, methods, and devices known to those of ordinary skill in the relevant arts may not be discussed in detail, but where appropriate, the techniques, methods, and devices should be regarded as a part of the specification. Further, it should be understood that the exemplary embodiments in the present application and the features in the embodiments can be combined with each other in various manners. Hereinafter, the present application will be described in detail with reference to the drawings and in conjunction with embodiments.

FIG. 1 shows a flowchart of an image processing method provided by an exemplary embodiment of the present application. The method can be applied to an image with a rectangular shape. As shown in FIG. 1, the method includes the following steps.

In step S101, the image is divided into a plurality of areas based on right angles of the image, and a corresponding rectangular coordinate system for the right angle is established within each of the plurality of areas. Herein, the plurality of areas corresponds to a plurality of right angles of the rectangular image, and within each of the plurality of areas, the rectangular coordinate system for the right angle in the area is established.

Figure 2:
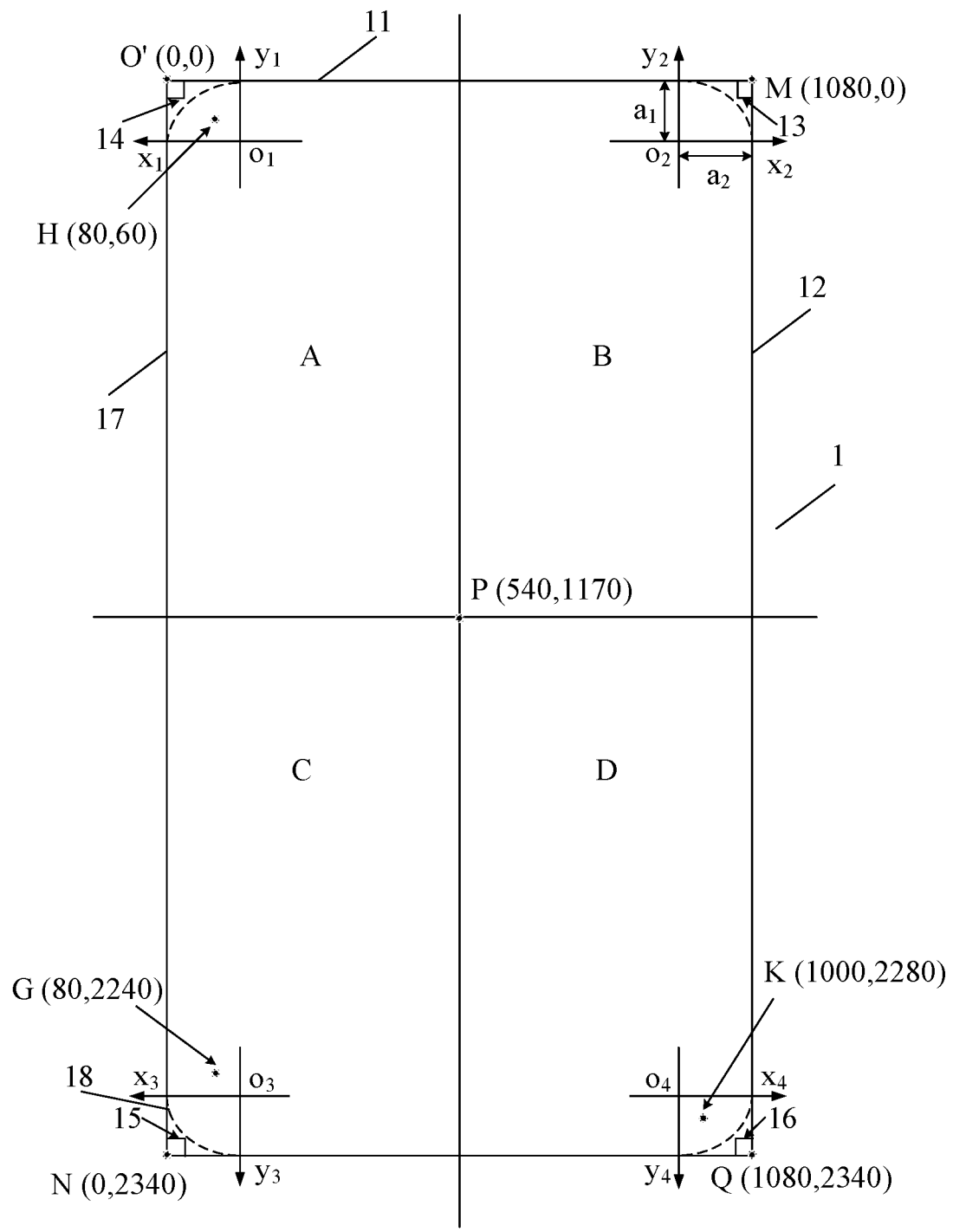
FIG. 2 is a schematic diagram of establishing a coordinate system in an image to be processed in an image processing method provided by an embodiment of the present application.

As shown in FIG. 2, based on the four right angles of the rectangular image 1, the rectangular image 1 is divided into four areas A, B, C, and D. In each area, there is the rectangular coordinate system corresponding to this area and the right angle in this area. Specifically, the four rectangular coordinate systems $x_1o_1y_1$, $x_2o_2y_2$, $x_3o_3y_3$ and $x_4o_4y_4$ correspond to the four areas A, B, C, and D and the right angles in the respective areas, respectively.

In each rectangular coordinate system, straight lines which are parallel to rectangular sides constituting the right angle and are at a first distance and a second distance from the rectangular sides respectively are taken as a first axis and a second axis of the rectangular coordinate system, and an intersection of the first axis and the second axis is taken as an origin of the rectangular coordinate system. In individual quadrants of the rectangular coordinate system, a quadrant where the right angle is located is taken as a first quadrant of the corresponding rectangular coordinate system.

The following takes the rectangular coordinate system $x_2o_2y_2$ as an example to describe the establishment of the rectangular coordinate system in detail. As shown in FIG. 2, the right angle 13 is formed by the intersection of rectangular sides 11 and 12, and a straight line $o_2x_2$ parallel to the rectangular side 11 and being at a first distance $a_1$ from the horizontal rectangular side 11 is taken as the first axis of the rectangular coordinate system $x_2o_2y_2$, and a straight line $o_2y_2$ parallel to the rectangular side 12 and being at a second distance $a_2$ from the longitudinal rectangular side 12 is taken as the second axis of the rectangular coordinate system $x_2o_2y_2$. The intersection $o_2$ of the straight lines $o_2x_2$ and $o_2y_2$ serves as the origin of the rectangular coordinate system $x_2o_2y_2$. Among the individual quadrants formed by the rectangular coordinate system $x_2o_2y_2$, the quadrant where the rectangular angle 13 is located is taken as the first quadrant of the rectangular coordinate system $x_2o_2y_2$. Herein, the first axis and the second axis may specifically be the x axis and the y axis of the rectangular coordinate system.

In this way, when the method similar to the above-mentioned establishment method of the rectangular coordinate system $x_2o_2y_2$ is used for the right angle in each area, a rectangular coordinate system $x_1o_1y_1$ corresponding to the area A and right angle 14, a rectangular coordinate system $x_3o_3y_3$ corresponding to the area C and right angle 15, and a rectangular coordinate system $x_4o_4y_4$ corresponding to the area D and right angle 16 can be formed, respectively, and the first quadrant of the rectangular coordinate system in each area is the quadrant wherein the right angle in the area is located.

It should be noted that the first distance $a_1$ and the second distance $a_2$ can be the same or different. For example, when the first distance $a_1$ and the second distance $a_2$ are different, an area enclosed by the first and second axes of the rectangular coordinate system and the rectangular sides of the corresponding area is a rectangle with unequal side lengths; when the first distance $a_1$ and the second distance $a_2$ are the same, an area enclosed by the first and second axes of the rectangular coordinate system and the rectangular sides of the corresponding area is a square. That is, the shape and size of the area defined by the first quadrant of the rectangular coordinate system in the rectangular image 1 are determined by the first distance $a_1$ and the second distance $a_2$. The specific values of the first distance $a_1$ and the second distance $a_2$ can be set differently according to actual conditions and specific requirements, which are not limited in the present application.

In step S102, it is determined whether a pixel in the image is located in the first quadrant of the rectangular coordinate system. Since the corresponding rectangular coordinate systems have been established for respective right angles of the rectangular image 1 in the step S101, and the quadrant where the right angle is located is set as the first quadrant of the rectangular coordinate system, it is determined whether the pixel is located in the first quadrant of the rectangular coordinate system in this step, that is, it is determined whether the pixel to be processed is located in the right angle area of the rectangular image 1. The right angle area can be understood as an edge area located near the right angle. In the embodiment of the present application, the right angle area is the area defined by the first quadrant of the rectangular coordinate system in the rectangular image. As mentioned above, the size of the area is determined by the first distance $a_1$ and the second distance $a_2$.

In step S103, if it is determined that the pixel is located in the first quadrant of the rectangular coordinate system, an operation is performed on the pixel; otherwise, no operation is performed on the pixel. If it is determined that the pixel is located in the first quadrant of the rectangular coordinate system, it is also determined that the pixel is located in the right angle area that may affect the image display, then further operations are performed on the pixel. For example, corresponding operations are performed on the pixel to further determine whether it is located within the round corner to be matched in the rectangular image, within an oblique angle formed by removing the right angle, etc., and then determine whether to perform further image processing operations on the pixel according to the above result. For example, transparency processing is performed on the pixel located outside the rounded-corner region. If it is determined that the pixel is not located in the first quadrant of the rectangular coordinate system, it is also determined that the pixel is located in the center area of the image or the edge area far from the right angle, which has no effect on the display of the right angle area of the image, so there is no need to perform further operation processing on the pixel.

Similarly, the embodiments of the present application are also applicable to images of other shapes, as long as the images are symmetrical with respect to two vertical axes.

In the image processing method provided by the embodiments of the present application, for the rectangular image, the image is first divided into the plurality of areas based on the right angles of the image, and the corresponding rectangular coordinate system for the right angle is established within each of the plurality of areas. The quadrant where the right angle is located is taken as the first quadrant of the corresponding rectangular coordinate system. Then it is determined whether the pixel in the image is located in the first quadrant of the rectangular coordinate system, and finally it is determined whether to perform further operations on the pixel to be processed according to the determination result. That is to say, the embodiments of the present application only perform further operation processing on the pixels that are determined to be located in the right angle areas that may affect the display of the image after determination, and do not perform further operation processing on the pixels located in other areas of the image that do not affect the display of the right angle area. These other areas have larger proportion relative to the right angle area of the image and contain more pixels. In this way, a large number of useless calculations of the pixels can be filtered out, which greatly reduces the amount of calculation and effectively reduces power consumption of the GPU, and improves the performance of terminal device.

Figure 3:
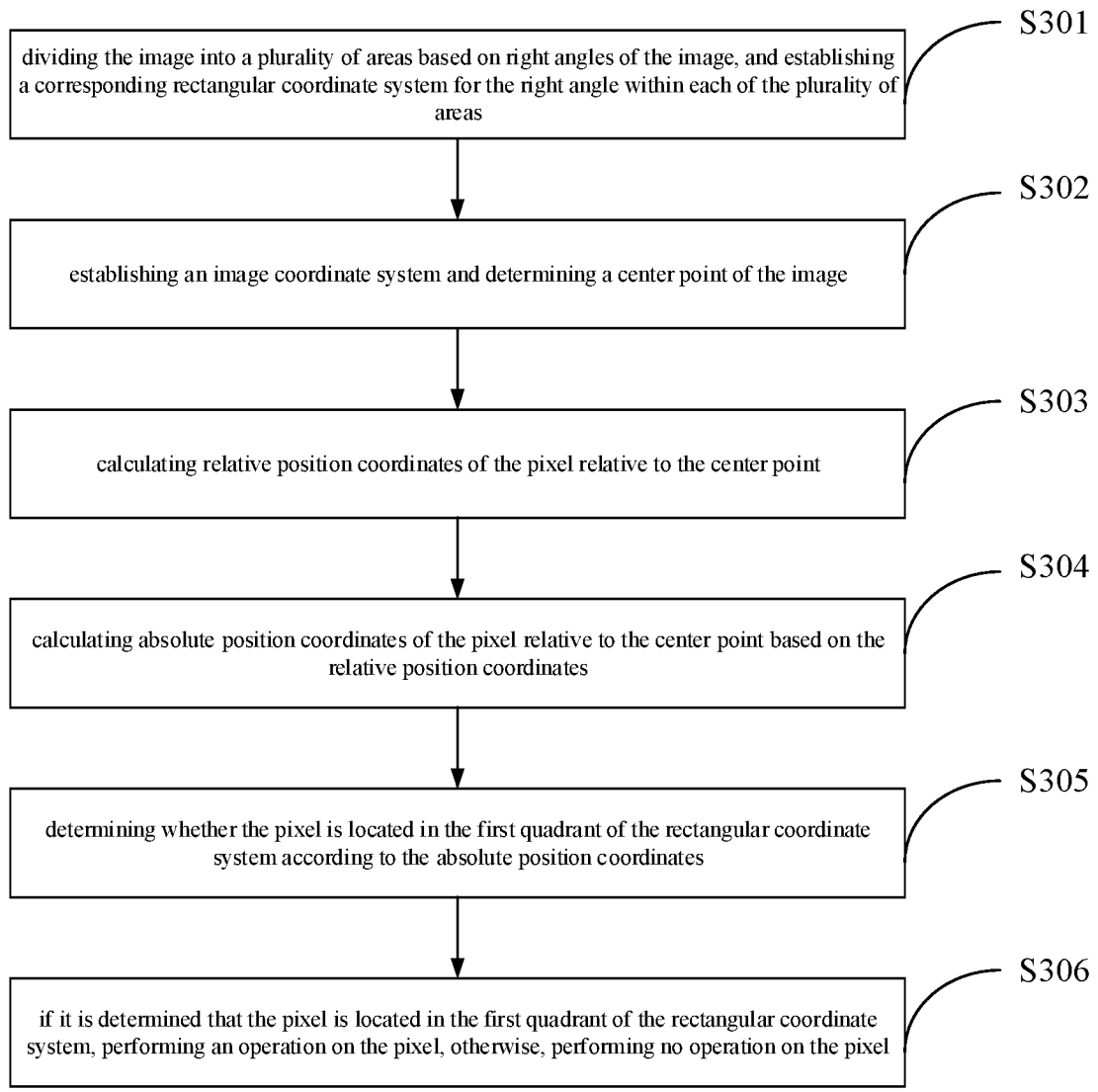
FIG. 3 is a flowchart of an image processing method provided by another embodiment of the present application.

FIG. 3 is a flowchart of an image processing method provided by another embodiment of the present application. As shown in FIG. 3, the method includes the following steps.

In step S301, the image is divided into a plurality of areas based on right angles of the image, and a corresponding rectangular coordinate system for the right angle is established within each of the plurality of areas. This step is similar to the step S101 in the foregoing embodiments, and will not be repeated herein.

In step S302, an image coordinate system is established and a center point of the image is determined. Specifically, a vertex of one right angle of the image is taken as an origin of the image coordinate system, two rectangular sides constituting the right angle are taken as positive semi-axes of a first axis and a second axis of the image coordinate system, respectively.

For example, an upper left corner of the image is taken as the origin of the image coordinate system, and an upper side and a left side of the image are taken as the positive semi-axes of the first axis and the second axis of the image coordinate system, respectively. The first axis and the second axis can be the x-axis and y-axis of the image coordinate system, respectively, that is, the upper left corner of the image is taken as the origin of the image coordinate system, a rightward direction and a downward direction are the positive directions of the x-axis and y-axis, respectively. In the following description, it is assumed that the upper left corner of the image is taken as the origin of the image coordinate system, and the upper and left sides of the image are taken as the positive semi-axes of the first axis and the second axis of the image coordinate system, respectively.

As shown in FIG. 2, it is assumed that the resolution of image 1 is 1080*2340, when the image coordinate system is established for image 1, point O' in the upper left corner of image 1 is taken as the origin of the image coordinate system, and the upper side 11 and the left side 17 of the image 1 are taken as the positive directions of the x-axis and the y-axis, then the coordinates of the point M in the upper right corner of the image 1 is (1080, 0), the coordinates of the point N in the lower left corner is (0, 2340), the coordinates of the point Q in the lower right corner is (1080, 2340), and the coordinates of the center point of image 1 is point P with coordinates (540, 1170).

In step S303, relative position coordinates of the pixel relative to the center point are calculated. In an embodiment, the step S303 specifically includes obtaining position coordinates of the pixel and the center point in the image coordinate system, and performing a subtraction operation on the position coordinates of the pixel and the position coordinates of the center point to obtain the relative position coordinates of the pixel relative to the center point. That is, through the step S303, the position coordinates of the pixel in the image coordinate system are converted into the coordinate values of the pixel in the coordinate system with the center point as the origin, and the rightward direction and the downward direction from the center point as the positive directions of the x-axis and y-axis respectively.

The pixel H in the image 1 being the pixel to be processed is taken as an example. First, the position coordinates of the pixel H and the center point P in the image coordinate system are obtained as (80, 60) and (540, 1170), respectively. After the subtraction operation is performed on the position coordinates of the pixel H and the center point P, the relative position coordinates (−460, −1110) of the pixel H relative to the center point P are obtained. That is, the coordinate values of the pixel H in the coordinate system with the center point P as the origin, and the rightward direction and the downward direction from the center point P as the positive directions of the x-axis and y-axis respectively are (−460, −1110).

In step S304, absolute position coordinates of the pixel relative to the center point are calculated based on the relative position coordinates. Specifically, absolute values of the relative position coordinates calculated in the step S303 are taken, and a subtraction operation is performed on the absolute values of the relative position coordinates and the position coordinates of the center point to obtain the absolute position coordinates of the pixel relative to the center point.

That is, in the step S304, first, by taking the absolute values of the relative position coordinates, the position coordinates of the pixel in the image coordinate system are converted into the coordinate values of the pixel in the first quadrant (which can be understood as the area D in the image) of the coordinate system with the center point as the origin, and the rightward direction and the downward direction from the center point as the positive directions of the x-axis and y-axis respectively. After the subtraction operation is performed on the coordinate values and the position coordinates of the center point, the coordinate values will be continuously converted into the coordinate values of the pixel in the coordinate system with the lower right corner (point Q) of image 1 as the origin, and the rightward direction and the downward direction from the point Q as the positive directions of the x-axis and y-axis respectively Still the pixel H is taken as an example, the absolute values of the relative position coordinates (−460, −1110) of the pixel H relative to the center point P are taken to obtain (460, 1110). That is, the position coordinates of the pixel H in the image coordinate system are converted into the coordinate values (460, 1110) in the first quadrant (the area D) of the coordinate system with the center point P as the origin, and the rightward direction and the downward direction from the center point P as the positive directions of the x-axis and y-axis respectively.

After the subtraction operation is performed on the absolute values and the position coordinates (540, 1170) of the center point P, the absolute position coordinates (−80, −60) of the pixel H relative to the center point P can be obtained. That is, the coordinate values of the pixel H in the coordinate system with the point Q as the origin, and the rightward direction and the downward direction from the point Q as the positive directions of the x-axis and y-axis respectively are obtained.

In step S305, it is determined whether the pixel is located in the first quadrant of the rectangular coordinate system according to the absolute position coordinates. In an embodiment of the present application, the values of the absolute position coordinates in a horizontal direction and vertical direction obtained in the step S304 are added to the second distance and the first distance respectively to obtain coordinate values of the pixel in the corresponding rectangular coordinate system.

It can be understood that, the coordinate system with the point Q as the origin, and the rightward direction and the downward direction from the point Q as the positive directions of the x-axis and y-axis respectively is shifted to the left by the second distance $a_2$ (a distance between the y-axis of the rectangular coordinate system and the longitudinal edge that constitutes the right angle corresponding to the rectangular coordinate system) and is shifted upwards by the first distance $a_1$ (the distance between the x-axis of the rectangular coordinate system and the horizontal edge that constitutes the right angle corresponding to the rectangular coordinate system) to obtain the rectangular coordinate system $x_4o_4y_4$ established in the step S301. The coordinate values of the pixel H in the coordinate system with the point Q as the origin, and the rightward direction and the downward direction from the point Q as the positive directions of the x-axis and y-axis respectively obtained in the step S304 are added to the second distance $a_2$ and the first distance respectively to obtain the coordinate values of the pixel H in the rectangular coordinate system $x_4o_4y_4$. If the coordinate values are positive, it is determined that the pixel is located in the first quadrant of the rectangular coordinate system.

The absolute position coordinates (−80, −60) of the pixel H relative to the center point P are obtained from the step S304, and the values of the absolute position coordinates in the horizontal and vertical directions are −80 and −60, respectively. It is assumed that when the rectangular coordinate system is established in the above step S301, the second distance $a_2$ and the first distance $a_1$ are taken as 100 and 80, respectively, which are added to the values of the absolute position coordinates of the pixel H relative to the center point P in the horizontal and vertical directions to obtain the coordinate values (20, 20) of the pixel H in its corresponding rectangular coordinate system $x_1o_1y_1$ finally.

As shown in FIG. 2, since the pixel H is located in the area A of the image 1, the rectangular coordinate system corresponding to the area A is $x_1o_1y_1$, so the rectangular coordinate system corresponding to the pixel H is also $x_1o_1y_1$. To determine whether the pixel H is located in the first quadrant of the rectangular coordinate system, it only needs to determine whether the pixel H is located in the first quadrant of its corresponding rectangular coordinate system $x_1o_1y_1$. According to the steps S303-S305, the coordinate values of the pixel H in its corresponding rectangular coordinate system $x_1o_1y_1$ is (20, 20). That is, the values on the x-axis and y-axis of the rectangular coordinate system $x_1o_1y_1$ are both positive, which indicates that the pixel H is located in the first quadrant of the rectangular coordinate system $x_1o_1y_1$. In other words, the pixel H is located in the right angle area that may affect the image display.

Next, the pixel G in the area C and the pixel K in the area D are taken as an example. It is determined whether the pixel G and the pixel K are located in the first quadrant of the rectangular coordinate system through steps S303-S305.

It is assumed that the first distance $a_1$ and the second distance $a_2$ are still 100 and 80, the position coordinates of the pixel G in the image coordinate system are (80, 2240), and after the subtraction operation is performed on the position coordinates of the pixel G and the position coordinates (540, 1170) of the center point P in the image coordinate system, the relative position coordinates (−460, 1070) of the pixel G relative to the center point P are obtained; the absolute values of the relative position coordinates (−460, 1070) of the pixel G relative to the center point P are taken to obtain (460, 1070). The subtraction operation is performed on the absolute values and the position coordinates (540, 1170) of the center point P to obtain the absolute position coordinates (−80, −100) of the pixel G relative to the center point P. The values −80 and −100 of the absolute position coordinates in the horizontal and vertical directions are respectively added to the second distance $a_2$ (100) and the first distance $a_1$ (80) to obtain the coordinate values (20, −20) of the pixel G in the corresponding rectangular coordinate system $x_3o_3y_3$. The coordinate values (20, −20) are located in the fourth quadrant of the rectangular coordinate system $x_3o_3y_3$ instead of the first quadrant, which indicates that the pixel G will not affect the display of the right angle area of the image 1.

It is assumed that the position coordinates of the pixel K in the image coordinate system are (1000, 2280), after the subtraction operation is performed on the position coordinates of the pixel K and the position coordinates (540, 1170) of the center point P in the image coordinate system, the relative position coordinates (460, 1110) of the pixel K relative to the center point P are obtained; the absolute values of the relative position coordinates (460, 1110) of the pixel K relative to the center point P are taken to obtain (460, 1110). The subtraction operation is performed on the absolute values and the position coordinates (540, 1170) of the center point P to obtain the absolute position coordinates (−80, −60) of the pixel K relative to the center point P. The values −80 and −60 of the absolute position coordinates in the horizontal and vertical directions are respectively added to the second distance $a_2$ (100) and the first distance $a_1$ (80) to obtain the coordinate values (20, 20) of the pixel K in the corresponding rectangular coordinate system $x_4o_4y_4$. The coordinate values (20, 20) are located in the first quadrant of the rectangular coordinate system $x_4o_4y_4$.

The embodiments of the present application first perform the subtraction operation on the position coordinates of the pixel to be processed and the position coordinates of the center point, that is, the position coordinates of the pixel in the image coordinate system are converted into the coordinate values of the pixel in the coordinate system with the center point as the origin, and the rightward direction and the downward direction from the center point as the positive directions of the x-axis and y-axis respectively. Then the absolute values of the coordinate values are taken to obtain the coordinate values of the pixel in the first quadrant of the coordinate system with the center point as the origin, and the rightward direction and the downward direction from the center point as the positive directions of the x-axis and y-axis respectively, which are the absolute coordinate values. After the subtraction operation is performed on the absolute coordinate values and the position coordinates of the center point to obtain the coordinate values of the pixel in the coordinate system with the point Q as the origin, and the rightward direction and the downward direction from the point Q as the positive directions of the x-axis and y-axis respectively. Finally, the coordinate values of the pixel in the rectangular coordinate system $x_4o_4y_4$ are obtained by coordinate translation. Since this method performs the coordinate conversion based on the center point of the image, any pixel in any area of the image can be subject to the operations such as the coordinate conversion, taking the absolute value in the steps S303-S305 to obtain the coordinate values of this pixel in the rectangular coordinate system $x_4o_4y_4$ at the bottom right corner of the image. This manner is simple for the operation, suitable for the calculation of pixels at any position in the image, and has strong versatility.

In step S306, if it is determined that the pixel is located in the first quadrant of the rectangular coordinate system, an operation is performed on the pixel; otherwise, no operation is performed on the pixel. Specifically, the coordinate values of the pixel in the corresponding rectangular coordinate system are substituted into a processing formula for calculation, and it is determined whether the pixel is located in an area defined by a curve represented by the processing formula. Further, the processing formula may be a round corner processing formula, an oblique angle processing formula, and the like, which is not limited in the present application. For example, when the processing formula is the round corner processing formula, the coordinate values of the pixel in the corresponding rectangular coordinate system can be substituted into the round corner processing formula for calculation, so as to determine whether the pixel is located in the area defined by the arc curve represented by the round corner processing formula.

Figure 4:
FIG. 4 is a schematic diagram of a display image to be formed after being processed by an image processing method provided by an embodiment of the present application.

It is assumed that when image 1 is to be processed as the displayed rounded image 2 shown in FIG. 4, when it is determined that the pixel to be processed is located in the first quadrant of the rectangular coordinate system, the coordinate values of the pixel in the corresponding rectangular coordinate system are substituted into the round corner processing formula $$\left(\text{such as } \frac{x^2}{a^2} + \frac{y^2}{b^2} = 1\right)$$

for calculation. If $$\frac{x^2}{a^2} + \frac{y^2}{b^2} < 1,$$

it is indicated that the pixel is located inside the round corner 18 shown in FIG. 2, that is, within the area defined by the arc curve represented by the round corner processing formula $$\frac{x^2}{a^2} + \frac{y^2}{b^2} = 1,$$

thus no further image processing operations may be performed on this pixel. If $$\frac{x^2}{a^2} + \frac{y^2}{b^2} \geq 1,$$

it is indicated that the pixel is located outside the round corner 18 or at the edge of the round corner 18 shown in FIG. 2, that is, on the arc curve represented by the round corner processing formula $$\frac{x^2}{a^2} + \frac{y^2}{b^2} = 1$$

or outside the area defined by the curve, thus it is required to perform further image processing on this pixel, such as the transparency processing to not to display this pixel.

In $$\frac{x^2}{a^2} + \frac{y^2}{b^2} = 1,$$

a and b can be equal or unequal. When a and b are unequal, the image 1 can be processed into the rounded image with an elliptical shape through the above processing steps. When a and b are equal, the image 1 can be processed into the rounded image with a round shape through the above processing steps. Those skilled in the art can set the second distance az and the first distance $a_1$ according to the pre-obtained parameters of the round corner, such as the arc and radius value (a, b) of the round corner. In this specific embodiment, the second distance az may be equal to the parameter a, and the first distance at may be equal to the parameter b.

For another example, when the processing formula is the oblique angle processing formula, the coordinate values of the pixel in the corresponding rectangular coordinate system can be substituted into the corresponding oblique angle processing formula for calculation, so as to determine whether the pixel is located in the area defined by the oblique line represented by the oblique angle processing formula. Similarly, the second distance $a_2$ and the first distance at can be set according to the angle of the oblique angle (parameter of the oblique line equation) to be obtained.

In addition, the method of the present application is also applicable to the situation of processing the right angles into other arbitrary shapes (such as irregular shapes), it is only necessary to substitute the coordinate values of the pixel in the corresponding rectangular coordinate system into the processing formula corresponding to the pre-formed shape for calculation.

In the image processing method provided by the embodiments of the present application, the image coordinate system is established with the upper left corner of the image as the origin, and the center point of the image is determined, and then the relative position coordinates and absolute position coordinates of the pixel relative to the center point are calculated to determine whether the pixel is located in the first quadrant of the rectangular coordinate system. This method uses the center point of the image as the reference point, and can calculate the absolute position coordinates of any pixel in the image relative to the center point by means of coordinate transformation. According to the absolute position coordinates, it can be determined whether the pixel is located in the first quadrant of the corresponding rectangular coordinate system, which is simple and effective, omits a large number of useless calculations of pixels, reduces the power consumption of the GPU, and improves the overall performance of the terminal device.

Figure 5:
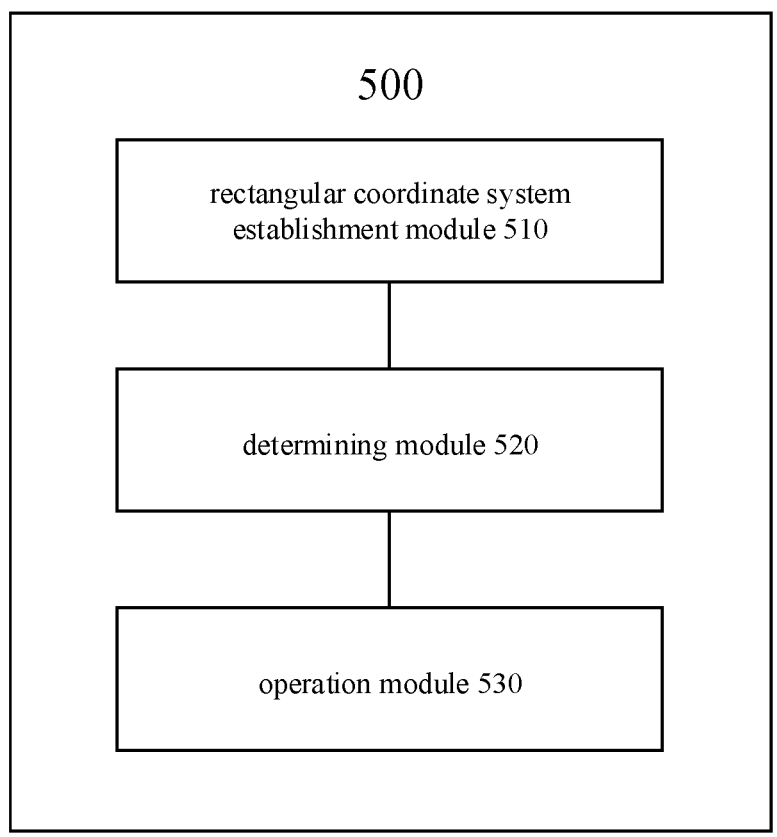
FIG. 5 is a schematic structural diagram of an image processing apparatus provided by an embodiment of the present application.

The embodiments of the present application also provide an image processing apparatus, which can be applied to an image having a rectangular shape. FIG. 5 is a schematic structural diagram of an image processing apparatus provided by an embodiment of the present application. As shown in FIG. 5, the apparatus 500 includes a rectangular coordinate system establishment module 510, a determining module 520, and an operation module 530. Of course, it should be understood that one or more of the modules described in this disclosure can be implemented by processing circuitry.

The rectangular coordinate system establishment module 510 is configured to divide the image into a plurality of areas based on right angles of the image, and establish a corresponding rectangular coordinate system for the right angle within each of the plurality of areas. Specifically, straight lines which are parallel to rectangular sides constituting the right angle and are at a first distance and a second distance from the rectangular sides respectively are taken as a first axis and a second axis of the rectangular coordinate system, and an intersection of the first axis and the second axis is taken as an origin of the rectangular coordinate system. In individual quadrants of the rectangular coordinate system, a quadrant where the right angle is located is taken as a first quadrant of the corresponding rectangular coordinate system.

The determining module 520 is configured to determine whether a pixel in the image is located in the first quadrant of the rectangular coordinate system.

The calculation module 530 is configured to: if it is determined that the pixel is located in the first quadrant of the rectangular coordinate system, perform an operation on the pixel; otherwise, perform no operation on the pixel.

In the image processing apparatus provided in the embodiment of the present application, the rectangular coordinate system establishment module 510 first divides the image into the plurality of areas based on the right angles of the image, and establish a corresponding rectangular coordinate system for the right angle within each of the plurality of areas. The quadrant where the right angle is located is taken as the first quadrant of the corresponding rectangular coordinate system. Then the determining module 520 determines whether the pixel in the image is located in the first quadrant of the rectangular coordinate system, and finally the operation module 530 determines whether to perform further operations on the pixel to be processed according to the determination result. That is to say, the embodiments of the present application only perform further operation processing on the pixels that are determined to be located in the right angle areas that may affect the display of the image after determination, and do not perform further operation processing on the pixels located in other areas of the image that do not affect the display of the right angle area. In this way, a large number of useless calculations of the pixels can be filtered out, which greatly reduces the amount of calculation and effectively reduces power consumption of the GPU, and improves the performance of terminal device.

Figure 6:
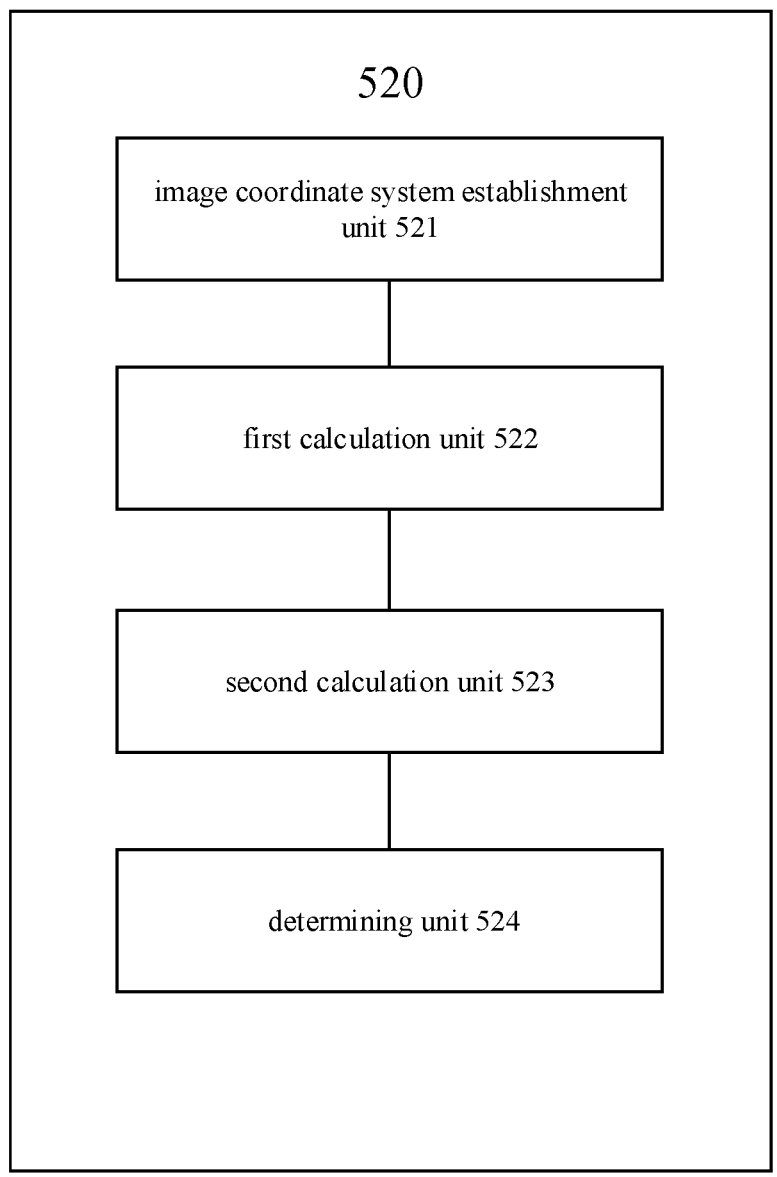
FIG. 6 is a schematic structural diagram of a determining module in an image processing apparatus provided by an embodiment of the present application.

In an embodiment of the present application, as shown in FIG. 6, the determining module 520 specifically includes an image coordinate system establishment unit 521, a first calculation unit 522, a second calculation unit 523 and a determining unit 524.

The image coordinate system establishment unit 521 is configured to establish an image coordinate system and determine a center point of the image. Specifically, the upper left corner of the image is taken as an origin of the image coordinate system, the upper side and left side of the image are taken as positive semi-axes of a first axis and a second axis of the image coordinate system, respectively.

The first calculation unit 522 is configured to calculate relative position coordinates of the pixel relative to the center point. In an embodiment, the first calculation unit 522 specifically includes an obtaining subunit, configured to obtain position coordinates of the pixel and the center point in the image coordinate system, and a calculating subunit, configured to perform a subtraction operation on the position coordinates of the pixel and the position coordinates of the center point to obtain the relative position coordinates of the pixel relative to the center point.

The second calculation unit 523 is configured to calculate absolute position coordinates of the pixel relative to the center point based on the relative position coordinates. In an embodiment, the second calculation unit 523 takes the absolute values of the relative position coordinate, and performs the subtraction operation on the absolute values of the relative position coordinate and the position coordinates of the center point to obtain the absolute position coordinates of the pixel relative to the center point.

The determining unit 524 is configured to determine whether the pixel is located in the first quadrant of the rectangular coordinate system according to the absolute position coordinates. In one embodiment, the determining unit 524 adds values of the absolute position coordinates in a horizontal direction and vertical direction to the second distance and the first distance respectively to obtain coordinate values of the pixel in the corresponding rectangular coordinate system. If the coordinate values are positive, it is determined that the pixel is located in the first quadrant of the rectangular coordinate system.

In an embodiment of the present application, the operation module 530 substitutes the coordinate values of the pixel in the corresponding rectangular coordinate system into a processing formula for calculation, and determines whether the pixel is located in an area defined by a curve represented by the processing formula.

In the image processing apparatus provided by the embodiment of the present application, the image coordinate system establishment unit 521 establishes the image coordinate system with the upper left corner of the image as the origin, and determines the center point of the image. The first calculation unit 522 and the second calculation unit 523 calculate the relative position coordinates and absolute position coordinates of the pixel relative to the center point, and then the determining unit 524 determines whether the pixel is located in the first quadrant of the rectangular coordinate system. This apparatus uses the center point of the image as the reference point, and can calculate the absolute position coordinates of any pixel in the image relative to the center point by means of coordinate transformation. According to the absolute position coordinates, it can be determined whether the pixel is located in the first quadrant of the corresponding rectangular coordinate system, which is simple and effective, omits a large number of useless calculations of pixels, reduces the power consumption of the GPU, and improves the overall performance of the terminal device.

It should be noted that the embodiments in the present application and the features in the embodiments can be combined with each other if there is no conflict. Hereinafter, the present application will be described in detail with reference to the drawings and in conjunction with embodiments.

It should be understood that the individual modules recorded in the apparatus 500 correspond to the individual steps in the method described above. Therefore, the operations and features described above for the method are also applicable to the apparatus 500 and the units contained therein, which will not be repeated herein. The apparatus 500 may be implemented in a browser or other security applications of an electronic device in advance, and may also be loaded into the browser or other security applications of the electronic device by downloading. Corresponding units in the apparatus 500 can cooperate with units in the electronic device to implement the solutions of the embodiments of the present application.

For the modules or units mentioned in the detailed description above, such division of modules or units is not mandatory. In fact, features and functions of two or more of the modules or units described above may be embodied in one module or unit in accordance with the embodiments of the present disclosure. Otherwise, the features and functions of one module or unit described above may be further divided into multiple modules or units to be embodied.

Figure 7:
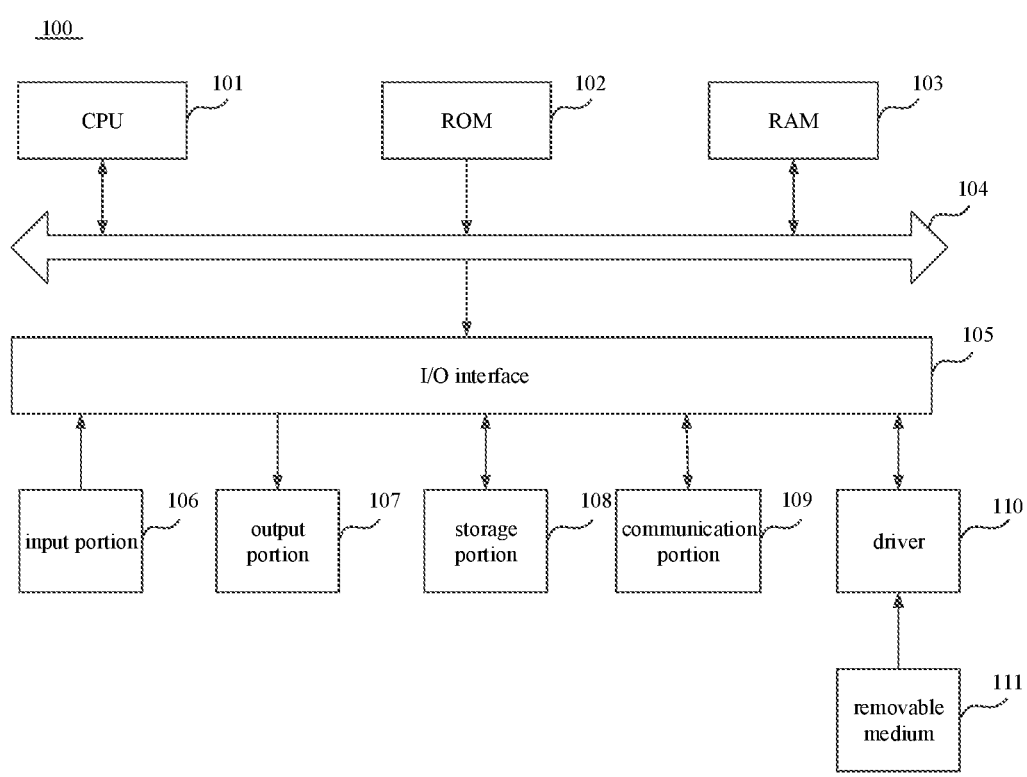
FIG. 7 is a schematic structural diagram of a computer system suitable for implementing a server or terminal device in an embodiment of the present application.

Referring now to FIG. 7, it shows a schematic structural diagram of a computer system 100 suitable for implementing a server or terminal device according to an embodiment of the present application.

As shown in FIG. 7, the computer system 100 includes a central processing unit (CPU) 101, which can perform various appropriate actions and processes based on a program stored in a read-only memory (ROM) 102 or a program loaded from the storage part into a random access memory (RAM) 103. In RAM 103, various programs and data necessary for the operations of the system 100 are also stored. The CPU 101, ROM 102 and RAM 103 are connected to each other through the bus 104. The input/output (I/O) interface 105 is also connected to the bus 104.

The following components can be connected to the I/O interface 105: an input portion 106 including a keyboard, a mouse, and the like; an output portion 107 including such as a cathode ray tube (CRT), a liquid crystal display (LCD) and a speaker; a storage portion 108 including a hard disk, and the like; and a communication portion 109 including a network interface card such as a LAN card, a modem, or the like. The communication portion 109 performs communication processing via a network such as the Internet. The driver 110 is also connected to the I/O interface 105 as needed. The removable medium 111, such as magnetic disks, optical disks, magneto-optical disks, semiconductor memories, and the like, are installed on the driver 110 as needed, so that the computer program read out therefrom is installed into the storage portion 108 as needed.

In particular, according to the embodiments of the present application, the process described above with reference to the flowchart of FIG. 1 can be implemented as a computer software program. For example, the present application includes a computer program product that includes a computer program carried in the machine-readable medium. The computer program contains program codes for executing the method shown in the flowchart. In such an embodiment, the computer program may be downloaded from the network through the communication portion 109 and installed, and/or installed from the removable medium 111. When the computer program is executed by the central processing unit (CPU) 101, the above-mentioned functions defined in the system of the present application are executed.

It should be noted that the computer-readable medium shown in the present application may be a computer-readable signal medium or a computer-readable storage medium, or any combination of the two. The computer-readable storage medium may be, for example, but not limited to, an electrical, magnetic, optical, electromagnetic, infrared, or semiconductor system, apparatus, or device, or a combination of any of the above. More specific examples of computer-readable storage media may include, but not limited to electrical connections with one or more wires, portable computer disks, hard disks, a random access memory (RAM), a read-only memory (ROM), an erasable programmable read only memory (EPROM or flash memory), an optical fiber, a portable compact disk read only memory (CD-ROM), an optical storage device, a magnetic storage device, or any suitable combination of the above. In the present application, the computer-readable storage medium may be any tangible medium that contains or stores a program, and the program may be used by or in combination with an instruction execution system, apparatus, or device. In the present application, a computer-readable signal medium may include a data signal propagated in a baseband or as a part of a carrier wave, and a computer-readable program code is carried therein. This propagated data signal can take many forms, including but not limited to: electromagnetic signals, optical signals, or any suitable combination of the foregoing. The computer-readable signal medium may also be any computer-readable medium other than the computer-readable storage medium. The computer-readable medium may send, propagate or transmit the program for use by or in combination with the instruction execution system, apparatus, or device. The program code contained on the computer-readable medium can be transmitted by any suitable medium, including but not limited to: wireless, wire, optical cable, RF, etc., or any suitable combination of the above.

The flowcharts and block diagrams in the drawings illustrate possible implementations of architecture, functions and operations of the system, method and computer program product according to various embodiments disclosed in the present application. In this regard, each block in the flowchart or block diagram may represent a module, a program segment, or a portion of codes, and the above-mentioned module, program segment, or the portion of codes contains one or more executable instructions for implementing specified logical functions. It should also be noted that, in some alternative implementations, the functions noted in the blocks may occur in an order different from that noted in the drawings. For example, two consecutive blocks can actually be executed in parallel, and sometimes they can also be executed in a reverse order, depending on the functions involved. It should also be noted that each block in the block diagram and/or flowchart, and a combination of blocks in the block diagram and/or flowchart, can be implemented with a dedicated hardware-based system that performs the specified function or operation, or with a combination of a dedicated hardware and computer instructions.

The units or modules involved in the embodiments described in the present disclosure can be implemented in software or hardware, such as processing circuitry. The described unit or module can also be provided in the processor. For example, it can be described as a processor includes a rectangular coordinate system establishment module 510, a determining module 520, and an operation module 530. The names of these modules do not constitute a limitation on the unit or the module itself under certain circumstances. For example, the rectangular coordinate system establishment module 510 can also be described as "a module for establishing a rectangular coordinate system".

As another aspect, the present application also provides a non-transitory computer-readable storage medium. The computer-readable storage medium may be included in the electronic device described in the above embodiments; or it may exist alone without being assembled into the electronic device. The computer readable storage medium stores one or more programs, and the foregoing programs are used by one or more processors to execute the configuration method described in the present application.

For example, the electronic device may implement step S101 to step S103 as shown in FIG. 1.

The above description is only a preferred embodiment of the present application and an explanation for the applied technical principles. Those skilled in the art should understand that the scope of disclosure involved in the present application is not limited to the technical solutions formed by the specific combination of the above technical features, and should also cover other technical solutions formed by any combination of the above technical features or equivalent features without departing from the aforementioned disclosed concept. For example, the above-mentioned features and the technical features disclosed in the present application (but not limited to) with similar functions are mutually replaced to form a technical solution.

What is claimed is:

1. An image processing method that is applied to an image with a rectangular shape, the method comprising:
dividing the image into a plurality of areas based on right angles of the image, and establishing a corresponding rectangular coordinate system for the right angle within each of the plurality of areas, where straight lines which are parallel to rectangular sides constituting the right angle and are at a first distance and a second distance from the rectangular sides, respectively, are taken as a first axis and a second axis of the rectangular coordinate system, an intersection of the first axis and the second axis is taken as an origin of the rectangular coordinate system, and, in individual quadrants of the rectangular coordinate system, a quadrant where the right angle is located is taken as a first quadrant of the corresponding rectangular coordinate system;
determining whether a pixel in the image is located in the first quadrant of the rectangular coordinate system; and
performing an operation on the pixel when the pixel is located in the first quadrant of the rectangular coordinate system, otherwise, performing no operation on the pixel,
wherein the determining whether a pixel in the image is located in the first quadrant further comprises:
establishing an image coordinate system and determining a center point of the image, where a vertex of one right angle of the image is taken as an origin of the image coordinate system, two rectangular sides constituting the right angle are taken as positive semi-axes of a first axis and a second axis of the image coordinate system, respectively;
calculating relative position coordinates of the pixel relative to the center point;
calculating absolute position coordinates of the pixel relative to the center point based on the relative position coordinates; and
determining whether the pixel is located in the first quadrant of the rectangular coordinate system according to the absolute position coordinates.

2. The method according to claim 1, wherein:
the calculating relative position coordinates of the pixel relative to the center point further comprises:
obtaining position coordinates of the pixel and the center point in the image coordinate system; and
performing a subtraction operation on the position coordinates of the pixel and the position coordinates of the center point to obtain the relative position coordinates of the pixel relative to the center point;
the calculating absolute position coordinates of the pixel relative to the center point based on the relative position coordinates comprises:
taking absolute values of the relative position coordinates, and performing the subtraction operation on the absolute values of the relative position coordinates and the position coordinates of the center point to obtain the absolute position coordinates of the pixel relative to the center point; and
the determining whether the pixel is located in the first quadrant of the rectangular coordinate system according to the absolute position coordinates comprises:
adding values of the absolute position coordinates in a horizontal direction and vertical direction to the second distance and the first distance, respectively, to obtain coordinate values of the pixel in the corresponding rectangular coordinate system, and if the coordinate values are positive, determining that the pixel is located in the first quadrant of the rectangular coordinate system.

3. The method according to claim 1, wherein the performing an operation on the pixel further comprises:
substituting coordinate values of the pixel in the corresponding rectangular coordinate system into a processing formula for calculation, and determining whether the pixel is located in an area defined by a curve represented by the processing formula.

4. The method according to claim 1, wherein the performing an operation on the pixel further comprises:
substituting coordinate values of the pixel in the corresponding rectangular coordinate system into a processing formula for calculation, and determining whether the pixel is located in an area defined by a curve represented by the processing formula.

5. The method according to claim 2, wherein the performing an operation on the pixel further comprises:
substituting the coordinate values of the pixel in the corresponding rectangular coordinate system into a processing formula for calculation, and determining whether the pixel is located in an area defined by a curve represented by the processing formula.

6. An image processing apparatus that applied to an image with a rectangular shape, the apparatus comprising:
a processor and a memory for storing instructions executable by the processor,
wherein the processor is configured to:
divide the image into a plurality of areas based on right angles of the image, and establish a corresponding rectangular coordinate system for the right angle within each of the plurality of areas, where straight lines which are parallel to rectangular sides constituting the right angle and are at a first distance and a second distance from the rectangular sides, respectively, are taken as a first axis and a second axis of the rectangular coordinate system, an intersection of the first axis and the second axis is taken as an origin of the rectangular coordinate system, and in individual quadrants of the rectangular coordinate system, a quadrant where the right angle is located is taken as a first quadrant of the corresponding rectangular coordinate system;
determine whether a pixel in the image is located in the first quadrant of the rectangular coordinate system; and
perform an operation on the pixel when the pixel is located in the first quadrant of the rectangular coordinate system, otherwise, perform no operation on the pixeL,
wherein the processor is further configured to:
establish an image coordinate system and determine a center point of the image, where a vertex of one right angle of the image is taken as an origin of the image coordinate system, two rectangular sides constituting the right angle are taken as positive semi-axes of a first axis and a second axis of the image coordinate systetn, respectively;
calculate relative position coordinates of the pixel relative to the center point;
calculate absolute position coordinates of the pixel relative to the center point based on the relative position coordinates; and
determine whether the pixel is located in the first quadrant of the rectangular coordinate system according to the absolute position coordinates.

7. The apparatus according to claim 6, wherein the processor is further configured to:
obtain position coordinates of the pixel and the center point in the image coordinate system; and
perform a subtraction operation on the position coordinates of the pixel and the position coordinates of the center point to obtain the relative position coordinates of the pixel relative to the center point;
take absolute values of the relative position coordinates, and perform the subtraction operation on the absolute values of the relative position coordinates and the position coordinates of the center point to obtain the absolute position coordinates of the pixel relative to the center point; and
add values of the absolute position coordinates in a horizontal direction and vertical direction to the second distance and the first distance respectively to obtain coordinate values of the pixel in the corresponding rectangular coordinate system, and if the coordinate values are positive, determine that the pixel is located in the first quadrant of the rectangular coordinate system.

8. The apparatus according to claim 6, wherein the processor is further configured to substitute coordinate values of the pixel in the corresponding rectangular coordinate system into a processing formula for calculation, and determine whether the pixel is located in an area defined by a curve represented by the processing formula.

9. The apparatus according to claim 6, wherein the processor is further configured to substitute coordinate values of the pixel in the corresponding rectangular coordinate system into a processing formula for calculation, and determine whether the pixel is located in an area defined by a curve represented by the processing formula.

10. The apparatus according to claim 7, wherein the processor is further configured to substitute the coordinate values of the pixel in the corresponding rectangular coordinate system into a processing formula for calculation, and determine whether the pixel is located in an area defined by a curve represented by the processing formula.

11. A terminal device, comprising a memory, a processor, and a computer program stored on the memory that, when executed by the processor, causes the processor to execute an image processing method, the method being applied to an image with a rectangular shape and comprising:
dividing the image into a plurality of areas based on right angles of the image, and establishing a corresponding rectangular coordinate system for the right angle within each of the plurality of areas, where straight lines which are parallel to rectangular sides constituting the right angle and are at a first distance and a second distance from the rectangular sides respectively are taken as a first axis and a second axis of the rectangular coordinate system, an intersection of the first axis and the second axis is taken as an origin of the rectangular coordinate system, and in individual quadrants of the rectangular coordinate system, a quadrant where the right angle is located is taken as a first quadrant of the corresponding rectangular coordinate system;
determining whether a pixel in the image is located in the first quadrant of the rectangular coordinate system; and
performing an operation on the pixel when the pixel is located in the first quadrant of the rectangular coordinate system, otherwise, performing no operation on the pixel,
wherein the determining whether a pixel in the image is located in the first quadrant further comprises:
establishing an image coordinate system and determining a center point of the image, where a vertex of one right angle of the image is taken as an origin of the image coordinate system, two rectangular sides constituting the right angle are taken as positive semi-axes of a first axis and a second axis of the image coordinate system, respectively;
calculating relative position coordinates of the pixel relative to the center point;

calculating absolute position coordinates of the pixel relative to the center point based on the relative position coordinates; and determining whether the pixel is located in the first quadrant of the rectangular coordinate system according to the absolute position coordinates.

12. A non-transitory computer storage medium with a computer program stored thereon, wherein the program implements the method according to claim 1 when executed by a processor.

* * * * *